(12) United States Patent
Atherton et al.

(10) Patent No.: US 9,262,284 B2
(45) Date of Patent: Feb. 16, 2016

(54) SINGLE CHANNEL MEMORY MIRROR

(75) Inventors: William E. Atherton, Hillsborough, NC (US); Jimmy G. Foster, Sr., Morrisville, NC (US)

(73) Assignee: LENOVO ENTERPRISE SOLUTIONS (SINGAPORE) PTE. LTD., New Tech Park (SG)

( * ) Notice: Subject to any disclaimer, the term of this patent is extended or adjusted under 35 U.S.C. 154(b) by 1312 days.

(21) Appl. No.: 11/567,964

(22) Filed: Dec. 7, 2006

(65) Prior Publication Data

US 2008/0140961 A1   Jun. 12, 2008

(51) Int. Cl.
*G06F 12/00* (2006.01)
*G06F 11/16* (2006.01)
*G06F 11/20* (2006.01)

(52) U.S. Cl.
CPC ............ *G06F 11/1666* (2013.01); *G06F 11/20* (2013.01)

(58) Field of Classification Search
USPC .................. 711/161, 162, 165, 170, E12.002; 710/107
See application file for complete search history.

(56) References Cited

U.S. PATENT DOCUMENTS

| | | | |
|---|---|---|---|
| 5,072,368 A | 12/1991 | Foreman et al. | |
| 5,694,581 A * | 12/1997 | Cheng | 710/7 |
| 6,046,946 A | 4/2000 | Nadeau-Dostie et al. | |
| 6,223,301 B1 * | 4/2001 | Santeler et al. | 714/6 |
| 6,813,688 B2 * | 11/2004 | Wu et al. | 711/114 |
| 6,954,832 B2 | 10/2005 | Suzuki et al. | |
| 7,143,250 B1 * | 11/2006 | Riedl | G06F 3/0613 710/37 |
| 7,506,130 B2 * | 3/2009 | Emmot et al. | 711/114 |
| 2002/0010875 A1 | 1/2002 | Johnson et al. | |
| 2002/0063473 A1 * | 5/2002 | Kramer et al. | 307/10.1 |
| 2002/0103966 A1 * | 8/2002 | Wu et al. | 711/162 |
| 2003/0188099 A1 | 10/2003 | Baxter, III | |
| 2003/0221058 A1 * | 11/2003 | Rentschler et al. | 711/114 |
| 2003/0221059 A1 * | 11/2003 | Emmot et al. | 711/114 |
| 2004/0090827 A1 | 5/2004 | Dahlen et al. | |
| 2005/0015539 A1 | 1/2005 | Horii et al. | |
| 2005/0108470 A1 * | 5/2005 | Gold et al. | 711/162 |
| 2006/0031643 A1 | 2/2006 | Figueira | |

OTHER PUBLICATIONS

Basilico, Ar; Error Correction System Using 'Shadow Memory'; TDB 05-84, p. 5792-5793.

* cited by examiner

*Primary Examiner* — Pierre-Michel Bataille
(74) *Attorney, Agent, or Firm* — Steven M. Greenberg, Esq.; CRGO Law

(57) ABSTRACT

Embodiments of the invention address deficiencies of the art in respect to memory fault tolerance, and provide a novel and non-obvious method, system and apparatus for single channel memory mirroring. In one embodiment of the invention, a single channel memory mirroring system can be provided. The single channel memory mirroring system can include a memory controller, a single communications channel, and an operational data portion of memory, and a duplicate data portion of memory, both portions being communicatively coupled to the memory controller over the single communications channel. Finally, the system can include single channel memory mirror logic. The logic can include program code enabled to mirror data in the operational data portion of memory in the duplicate data portion of memory.

14 Claims, 3 Drawing Sheets

SINGLE CHANNEL MEMORY MIRROR

BACKGROUND OF THE INVENTION

1. Field of the Invention

The present invention relates to the field of memory fault tolerance in high performance computing and more particular to memory redundancy through memory mirroring.

2. Description of the Related Art

Memory refers to an electronic device configured to store information—generally in binary form. Memory often refers to dynamic memory including dynamic random access memory (DRAM) in which charges within small capacitors are continually refreshed selectively to store high and low signals representative of binary values. In as much as the ultimate representation of a binary value is physical in nature, errors can occur. In that the integrity of values in memory reflect the most critical aspect of any computing system, it is imperative that errors in memory are identified immediately and handled accordingly.

Memory can be susceptible to two basic types of errors: hard and soft. Hard errors refer to structural imperfections in the memory module itself in which the memory stores a particular value irrespective of the value written to memory. In the case of a hard error, the symptoms are repeatable and persistent. Soft errors, by comparison, often are transient and result from logical imperfections in controlling reading to and writing from memory. In that soft errors generally are transient in nature, soft error can be very difficult to diagnose and correct.

Memory fault tolerance refers to mechanisms established to cope with hard errors and soft errors in memory in order to remediate and recover where possible. Memory fault tolerance often begins with the detection of a memory error. Early forms of detection utilize parity bit checking. The parity bit, as it is well-known, indicates either an even or odd parity for stored information. The parity of retrieved information can be compared to the parity bit value to readily detect an obvious failure where no match occurs. Error correction code (ECC) processing, by comparison, involves the generation of a single sum for all bits (checksum) that can be compared to the sum of all bits for retrieved information. Again, the failure to match will indicate a memory failure.

It is well-known that ECC utilization can be effective for small, isolated soft errors in memory. For very large systems, however, multiple, soft errors are more common and ECC utilization cannot correct so many soft errors. Accordingly, more advanced forms of fault tolerance have become prevalent in larger computing systems. The most common form of fault tolerance in the latter circumstance is memory redundancy. Memory redundancy refers to the deployment of more memory than utilized to provide for failover in the event of a faulty bank of memory. One such form of memory redundancy includes spare-bank memory, while another form includes memory redundant array of independent dual inline memory modules (RAID).

A third form of memory redundancy includes memory mirroring. Memory mirroring refers to the use of redundant copies of system memory. In memory mirroring, when a multi-bit error is detected when memory is accessed, the system instead of performing a hard stop, can immediately fail over to a read from a mirror image of the failed memory. Consequently, memory mirroring can provide a high level of fault tolerance. Notwithstanding, memory mirroring can consume substantial resources in that two or more channels of memory are required to achieve mirroring with one channel including memory allocated for operational data and one channel including memory allocated for duplicate data. Even in the instance where half of all memory across both channels is allocated for mirroring, half of the available memory bandwidth is consumed with writing duplicate data leaving only half of the available memory bandwidth for use in writing operational data.

BRIEF SUMMARY OF THE INVENTION

Embodiments of the invention address deficiencies of the art in respect to memory fault tolerance, and provide a novel and non-obvious method, system and apparatus for single channel memory mirroring. In one embodiment of the invention, a single channel memory mirroring system can be provided. The single channel memory mirroring system can include a memory controller, a single communications channel, and an operational data portion of memory, and a duplicate data portion of memory, both portions being communicatively coupled to the memory controller over the single communications channel. Finally, the system can include single channel memory mirror logic. The logic can include program code enabled to mirror data in the operational data portion of memory in the duplicate data portion of memory.

In one aspect of the embodiment, the operational data portion of memory can be disposed in a first memory module coupled to the memory controller over the single communications channel. Likewise, the duplicate data portion of memory can be disposed in a second memory module coupled to the memory controller over the single communications channel. In another aspect of the invention, the operational data portion of memory can be disposed across a first grouping of memory modules and the duplicate data portion of memory can be disposed across a second grouping of memory modules both over the single communications channel. Finally, in yet another aspect of the invention, the operational data portion of memory can be disposed in a first portion of a single memory module and the duplicate data portion of memory can be disposed in a second portion of the single memory module.

In another embodiment of the invention, a single channel memory mirroring method can be provided and can include writing operational and duplicate data during memory mirroring to respective operational data and duplicate data portions of memory concurrently over a single communications channel. Writing operational and duplicate data during memory mirroring to respective operational data and duplicate data portions of memory concurrently over a single communications channel can include, for instance, first retrieving a location of operational data in a first memory module, second retrieving a location of duplicate data in a second memory module, activating a chip select for each of the memory modules, and writing data to both locations simultaneously over the single communications channel.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide a method, system and computer program product for a single channel memory mirror. In accordance with an embodiment of the present invention, memory can be coupled to a memory controller over a single channel of communication. The memory can include, for example, one or more memory modules and can be partitioned into operational data and duplicate data portions. When reading data from memory, the controller can select the operational data portion for the read operation. However, when writing data to memory, the controller can select both the operational data portion and the duplicate data portion for a single write operation over the single channel of communication. In this way, the full available memory bandwidth can be utilized on both read and write operations irrespective of memory mirroring.

Figure 1A:
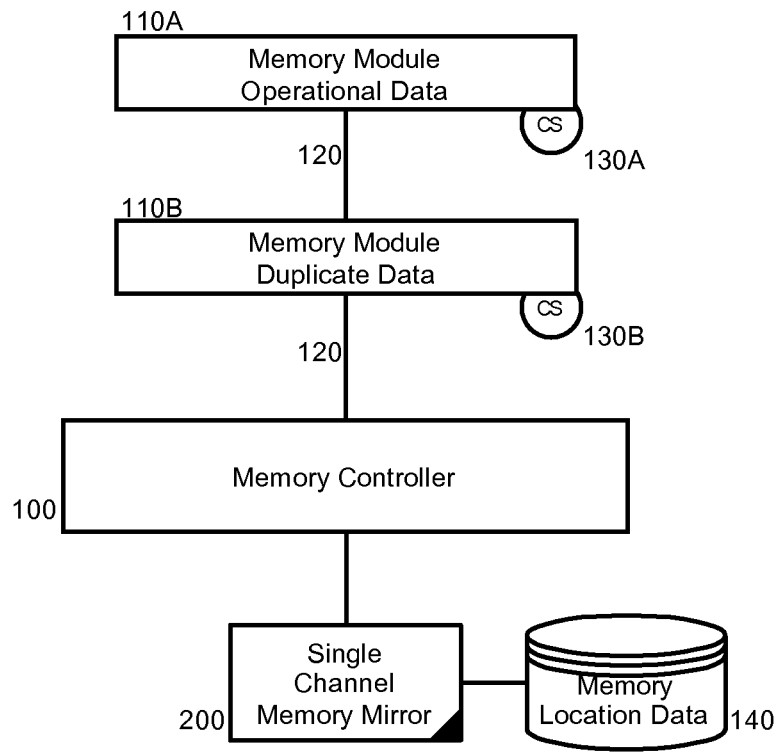
FIGS. 1A through 1E, taken together, are a schematic illustration of a single channel memory mirroring system; and, FIG. 2 is a flow chart illustrating a process for single channel memory mirroring.
Figure 1B:
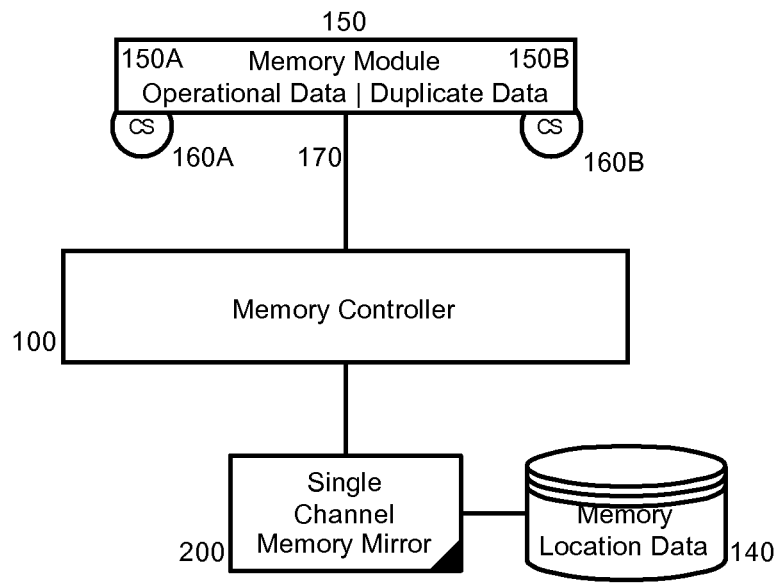

In further illustration, FIG. 1A is a schematic illustration of a single channel memory mirroring system utilizing pairs of memory modules. As shown in FIG. 1A, the system can include a memory controller 100 coupled to a pair of memory modules 110A, 110B over a single communications channel 120. The memory controller 100 can be configured to manage read and write operations to selected ones of the memory modules 110A, 110B through the operation of the chip select 130A, 130B for each respective one of the memory modules 110A, 110B. The memory controller 100 can be configured to manage read and write operations to the memory modules 110A, 110B over a point-to-point bus supporting bi-directional communication, or unidirectional communication in which case separate busses will be required-one for reading and one for writing.

Importantly, memory module 110A can be assigned to store operational data whereas memory module 110B can be assigned to store duplicate data mirrored during write operations to memory module 110A. It is to be recognized by the skilled artisan that although only two memory modules 110A, 110B are shown in FIG. 1A, in which memory module 110A stores operational data while memory module 110B stores duplicate data, the invention is not so limited and multiple memory modules coupled to the single communications channel 120 can be assigned to store operational data whereas an equal number of memory modules coupled to the single communications channel 120 can be assigned to store corresponding duplicate data.

Likewise, only a portion of any one memory module on the single communications channel 120 can be assigned to store operational data, while the remaining portion of the memory module on the single communications channel 120 can be assigned to store corresponding duplicate data. In all cases, the assignment of memory module portions to store either operational data or duplicate data can be recorded in location data store 140 coupled to the memory controller 100. Finally, the memory modules can be disposed across multiple different single communications channels, either configured in traditional mode or independent single channels mode.

In accordance with the invention, single channel memory mirror logic 200 can be coupled to the memory controller 100. The single channel memory mirror logic 200 can include program code enabled to simultaneously activate chip selects 130A, 130B for corresponding memory modules 110A, 10B in order to write data both to the operational data portion of memory module 110A and the duplicate data portion of the memory module 110B without consuming excess channel bandwidth and without requiring separate channels for the memory module 110A and the memory module 110B. Rather, the write to both memory modules 110A, 110B can occur simultaneously by way of a dual selection of both chip selects 130A, 130B.

In an alternative embodiment of the invention, a single memory module 150 can be partitioned into a separate operational data portion 150A and a duplicate data portion 150B. The location of each portion 150A, 150B can be recorded in the location data store 140. The program code of the single channel memory mirror logic 200 can be enabled, in the alternative embodiment, to concurrently write data both the operational data portion 150A and the duplicate data portion 150B by activating chip selects 160A, 160B for each portion 150A, 150B.

Figure 1C:
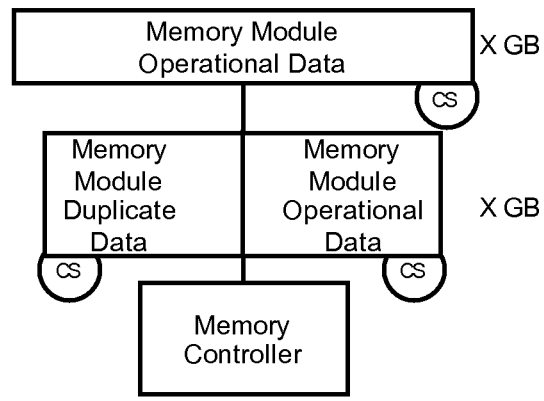
Figure 1D:
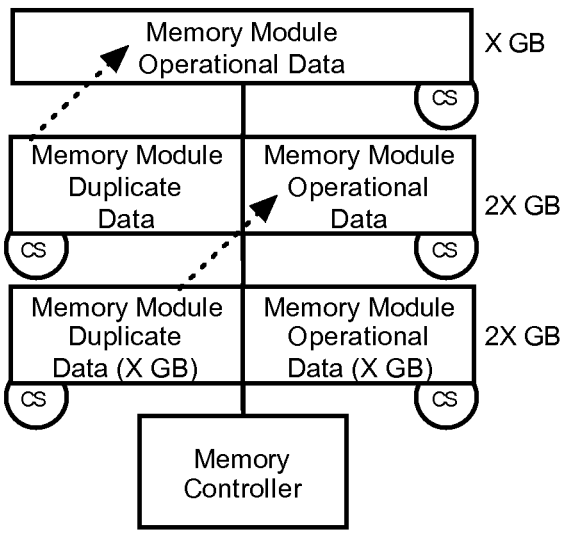
Figure 1E:
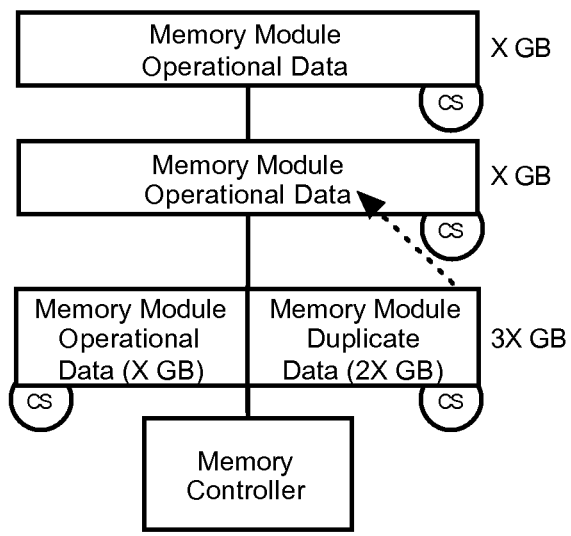

Referring to FIG. 1C, as another alternative embodiment, it will be understood by the skilled artisan that only selected memory modules on the single communications channel need be partitioned so long as the duplicate data portion of the module is allocated enough size to accommodate a corresponding operational data portion. Likewise, in FIG. 1D, duplicate data portions of a module can support the operational data portions of other memory modules over the single communications channel. Finally, as shown in FIG. 1E, a duplicate data portion in a single module can support the operational data not only within the same module, but also in addition to the operational data in another module over the single communications channel.

Figure 2:
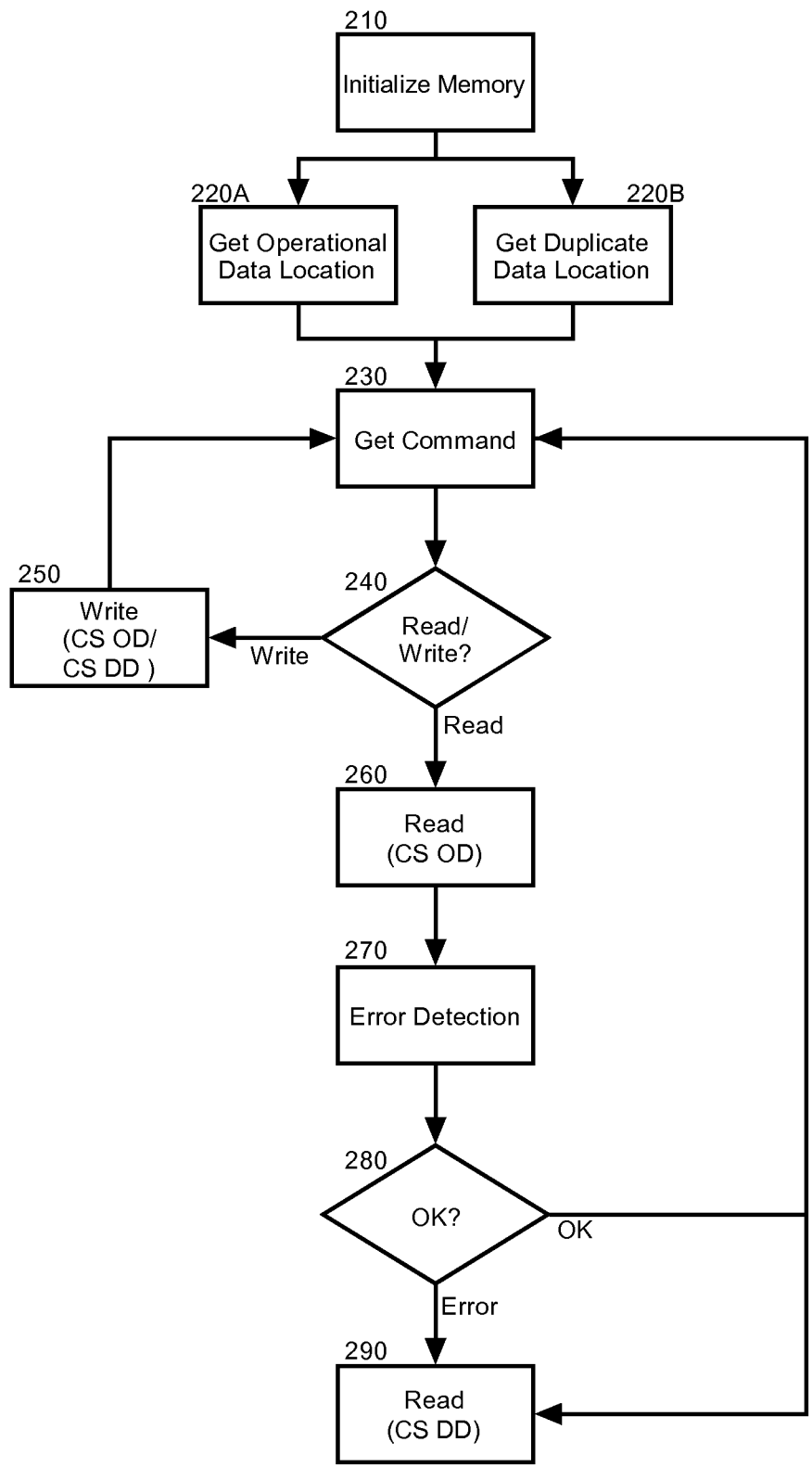

In yet further illustration, FIG. 2 is a flow chart illustrating a process for single channel memory mirroring. Beginning in block 210, one or more memory modules coupled to the controller over a single communications channel can be initialized for storing both operational data and duplicate data for memory mirroring. The memory modules can include any combination of dual inline memory modules (DIMMs), Flash memory, programmable read-only memories, fixed disks and the like. In block 220A, a location for the operational data in the memory modules can be determined as can a location for the duplicate data in the memory modules in block 220B. Notably, the respective locations can be within different memory modules on the single communications channel, or within the same memory module on the single communications channel.

In block 230, a command can be received to either read data from or write data to the memory module. In decision block 240, if the command is a write command, in block 250 the chip select for both the operational data portion of the memory module and the duplicate data portion of the memory module can be selected concurrently. Thereafter, the data can be written to memory. By comparison, in decision block 240, if the command is a read command, in block 260, the chip select only for the operational data portion of the memory module can be selected and data read therefrom into a buffer. In decision block 270, the data in the buffer can be subjected to error detection and, in decision block 280, if an error is detected, in block 290, the data can be read from the duplicate data portion of the memory module.

The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, or transport the program for use by or in connection with the instruction execution system, apparatus, or device. The medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A single channel memory mirroring system comprising:
   a memory controller;
   a single communications channel;
   an operational data portion of memory, and a duplicate data portion of memory, both portions being communicatively coupled to the memory controller over the single communications channel;
   a location data store coupled to the memory controller and storing an assignment of the each portion of the memory as either storing operational data or duplicate data; and,
   single channel memory mirror logic executing in the memory controller and comprising program code enabled to mirror data in the operational data portion of memory in the duplicate data portion of memory based upon the assignment for each of the portions in the location data store.

2. The system of claim 1, wherein the operational data portion of memory is disposed in a first memory module coupled to the memory controller over the single communications channel, and wherein the duplicate data portion of memory is disposed in a second memory module coupled to the memory controller over the single communications channel.

3. The system of claim 1, wherein the operational data portion of memory is disposed across a first grouping of memory modules coupled to the memory controller over the single communications channel, and wherein the duplicate data portion of memory is disposed across a second grouping of memory modules coupled to the memory controller over the single communications channel.

4. The system of claim 1, wherein the operational data portion of memory is disposed in a first portion of a single memory module coupled to the memory controller over the single communications channel, and wherein the duplicate data portion of memory is disposed in a second portion of the single memory module coupled to the memory controller over the single communications channel.

5. The system of claim 1, wherein the operational data portion of memory is disposed in both a first memory module coupled to the memory controller over the single communications channel, and also in a second memory module coupled to the memory controller over the single communications channel, and wherein the duplicate data portion of memory is disposed in the second memory module coupled to the memory controller over the single communications channel.

6. The system of claim 2, wherein the program code of the single channel memory mirror logic is enabled to mirror data in the operational data portion of memory in the duplicate data portion of memory by concurrently selecting chip selects for each of the first and second memory modules during a write operation.

7. A single channel memory mirroring method comprising:
   determining an assignment of each portion of a memory as either storing operational data or duplicate data;
   storing each determined assignment in a location data store coupled to a memory controller of the memory; and,
   writing operational and duplicate data during memory mirroring to respective operational data and duplicate data portions of memory, as specified by each assignment in the location data store, concurrently over a single communications channel.

8. The method of claim 7, wherein writing operational and duplicate data during memory mirroring to respective operational data and duplicate data portions of memory concurrently over a single communications channel, comprises:
   first retrieving a location of operational data in a first memory module;
   second retrieving a location of duplicate data in a second memory module;
   activating a chip select for each of the memory modules; and,
   writing data to both locations simultaneously over the single communications channel.

9. The method of claim 7, wherein writing operational and duplicate data during memory mirroring to respective operational data and duplicate data portions of memory concurrently over a single communications channel, comprises:
   first retrieving a location of operational data in a first grouping of memory modules;
   second retrieving a location of duplicate data in a second grouping of memory modules;
   activating chip selects for each of the groupings; and,
   writing data to both locations simultaneously over the single communications channel.

10. The method of claim 7, wherein writing operational and duplicate data during memory mirroring to respective operational data and duplicate data portions of memory concurrently over a single communications channel, comprises:
   first retrieving a location of operational data in a single memory module;
   second retrieving a location of duplicate data in the single memory module;
   activating a chip select for the single memory module; and, writing data to both locations simultaneously over the single communications channel.

11. A computer program product comprising a computer usable medium embodying non-transitory computer usable program code for single channel memory mirroring, the computer program product comprising computer usable program code for:

determining an assignment of each portion of a memory as either storing operational data or duplicate data;

storing each determined assignment in a location data store coupled to a memory controller of the memory; and, writing operational and duplicate data during memory mirroring to respective operational data and duplicate data portions of memory, as specified by each assignment in the location data store, concurrently over a single communications channel.

12. The computer program product of claim 11, wherein the computer usable program code for writing operational and duplicate data during memory mirroring to respective operational data and duplicate data portions of memory concurrently over a single communications channel, comprises:

computer usable program code for first retrieving a location of operational data in a first memory module;

computer usable program code for second retrieving a location of duplicate data in a second memory module;

computer usable program code for activating a chip select for each of the memory modules; and, computer usable program code for writing data to both locations simultaneously over the single communications channel.

13. The computer program product of claim 11, wherein the computer usable program code for writing operational and duplicate data during memory mirroring to respective operational data and duplicate data portions of memory concurrently over a single communications channel, comprises:

computer usable program code for first retrieving a location of operational data in a first grouping of memory modules;

computer usable program code for second retrieving a location of duplicate data in a second grouping of memory modules;

computer usable program code for activating chip selects for each of the groupings; and, computer usable program code for writing data to both locations simultaneously over the single communications channel.

14. The computer program product of claim 11, wherein the computer usable program code for writing operational and duplicate data during memory mirroring to respective operational data and duplicate data portions of memory concurrently over a single communications channel, comprises:

computer usable program code for first retrieving a location of operational data in a single memory module;

computer usable program code for second retrieving a location of duplicate data in the single memory module;

computer usable program code for activating a chip select for the single memory module; and, computer usable program code for writing data to both locations simultaneously over the single communications channel.

\* \* \* \* \*